United States Patent [19]
Bendel

[11] 3,984,326
[45] Oct. 5, 1976

[54] GRAVITY FILTERING EQUIPMENT
[75] Inventor: Henry Bendel, Geneva, Switzerland
[73] Assignee: Pista S.A., Geneva, Switzerland
[22] Filed: Nov. 15, 1974
[21] Appl. No.: 524,254

[30] Foreign Application Priority Data
Nov. 26, 1973 Switzerland.................. 16557/73

[52] U.S. Cl................................. 210/264; 210/275
[51] Int. Cl.².......................................... B01D 23/24
[58] Field of Search .............. 210/80, 82, 264, 275, 210/293, 333, 340, 341, 416, 427

[56] References Cited
UNITED STATES PATENTS
2,302,449  11/1942  Laughlin ........................... 210/275
2,302,450  11/1942  Laughlin ........................... 210/264
3,134,735  5/1964   Greenleaf .......................... 210/293

Primary Examiner—Thomas G. Wyse
Assistant Examiner—Ivars Cintins
Attorney, Agent, or Firm—Emory L. Groff, Jr.

[57] ABSTRACT

A gravity filtering equipment comprising a basin partitioned into a plurality of compartments each having a permeable bottom covered by a filtering bed and a device for flushing such filtering beds. This device comprises a bell adaptable fluid-tightly onto the upper edges of each compartment in turn and provided with a pump for sucking up filtered water, from a collecting chamber provided underneath the permeable bottom of each such compartment, through its filtering bed.

1 Claim, 3 Drawing Figures

GRAVITY FILTERING EQUIPMENT

The invention relates to a gravity filtering equipment, particularly, but not exclusively, for water purification stations.

Such equipment for filtering by gravity through a filtering bed of sand, for example, becomes clogged after varying periods of use according to the proportion of impurities in suspension in the liquid to be filtered.

Generally, such filtering beds are cleaned by countercurrent flushing from the bottom to the top. In a known water filtering equipment of this type, during flushing of the filter, both a valve in a filtered-water conduit and a valve in a raw-water inlet conduit are closed. Then, a valve for the inlet of flushing water into the filter is opened, this water being injected under pressure by a pump; simultaneously, a valve in a dirty-water conduit is opened.

The cost of such equipment is high because of the large number of conduits and valves required. Also, the placing of a filter out of circuit and flushing its filtering bed requires the intervention of an operator.

A gravity filtering equipment according to the invention, comprises a basin partitioned into a plurality of compartments each having a permeable bottom covered by a filtering bed, a conduit for inlet of liquid to be filtered above the filtering beds, a filtered-liquid collection chamber disposed under the permeable bottoms of the compartments and connected to a filtered-liquid evacuation conduit by an evacuating shaft and an overflow neighbouring the upper edge of the basin, and a device for flushing the filtering beds, said device comprising a bell movably carried above the basin by a support in a manner to be able to be successively brought above each of said compartments to fluid-tightly obturate the upper edges thereof one at a time, and a pump having an intake end connected to a conduit leading into the inner face of the bell and an outlet end connected to a conduit for evacuating flushing liquid from the filtering beds.

The accompanying drawings show, schematically and by way of example, a filtering equipment according to the invention. In the drawings.

Figure 2:
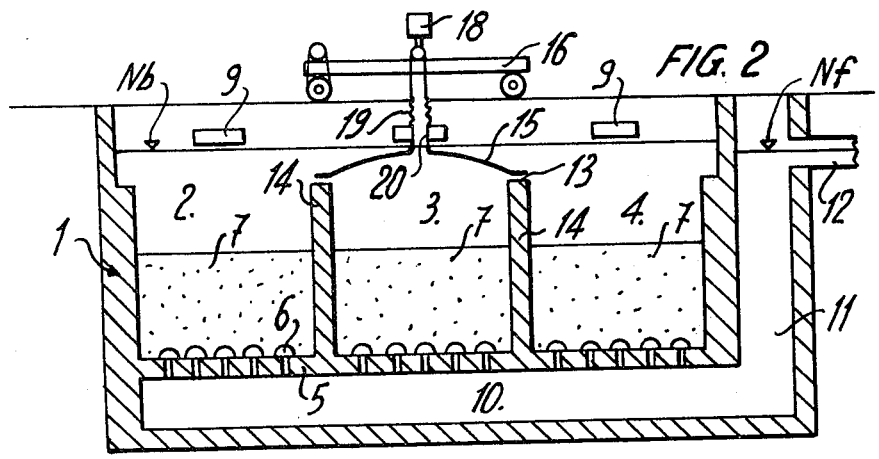
FIG. 2 is a longitudinal cross-section taken along line II—II of FIG. 1.
Figure 1:
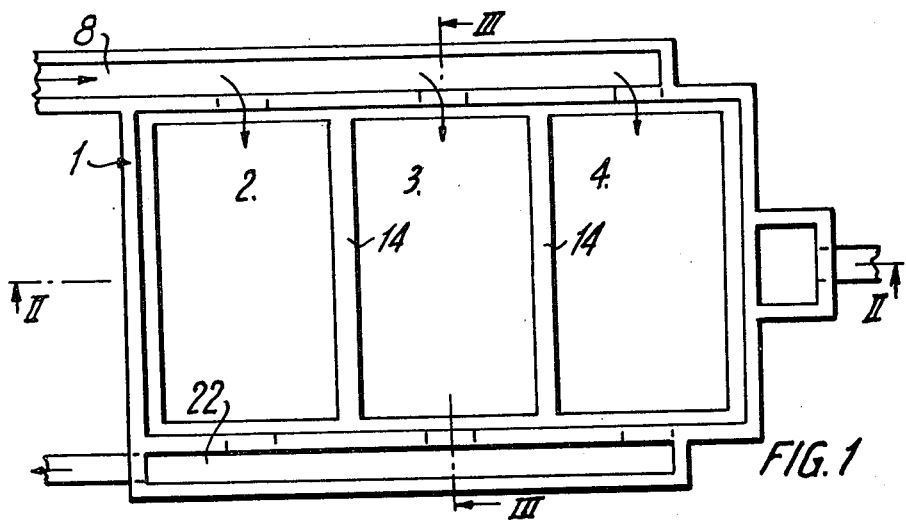
FIG. 1 is a top plan view thereof.

The filtering equipment shown in the drawings comprises a basin 1 sub-divided into three compartments 2, 3 and 4 each having a bottom 5 provided with strainers 6 whose holes have a diameter of the order of 0.4 mm. A layer of sand about 50 cm thick covers the bottom of each compartment, to form a filtering bed 7. The diameter of the grains of sand of filtering bed 7 is of the order of 0.6 to 1 mm.

This equipment, for the filtration of water, also comprises a raw water supply pipe 8 communicating with the basin 1 by ports 9 provided above each of the compartments 2–4.

A filtered water collection chamber 10, common to the three compartments 2–4, is provided under the bottoms 5 of the latter. Chamber 10 is connected by an evacuation shaft 11 to an overflow 12 located at an intermediary level between the upper edges 13 of the partitions 14 of compartments 2–4 and the ports 9 of the raw water supply pipe 8.

Consequently, the level of raw water in the basin 1 is maintained permanently above the upper edge of the partitions 14 of compartments 2–4. However, as the filtering bed 7 becomes clogged, a head loss is produced and the level of raw water in the basin 1 rises. When, as a result of this raising of raw water in the basin 1, the water passes a predetermined level, a device for cleaning the filtering beds 7 is triggered.

This device comprises a bell 15 of dimensions such that its edges can come to be applied on the upper edges of the partitions of compartments 2–4 to obturate the upper end of any one of the compartments in a fluid-tight manner. The bell 15 is suspended from a rolling bridge 16 and can be moved heightwise by hydraulically controlled jacks 17.

A pump 18 mounted on the rolling bridge 16 has an intake end connected by a flexible tube 19 to a conduit 20 leading into the inner face of the bell 15 and an outlet end connected to a conduit 21 leading into a channel 22 for the evacuation of dirty water.

The equipment operates as follows:

The raw water supplied to the compartments 2–4 of basin 1 by the ports 9 passes through the filtering beds 7. The thus-filtered water passes through the strainers 6 in the bottoms 5 of compartments 2–4 and is collected in the filtered-water collecting chamber 10 from where it flows away by the evacuation shaft 11 and overflow 12.

When the difference between the level $N_b$ of raw water in basin 1 and the level $N_f$ of filtered water in the overflow 12 reaches a value of 30 cm, a float (not shown) triggers a programmer controlling the device for cleaning filtering beds 7.

Figure 3:
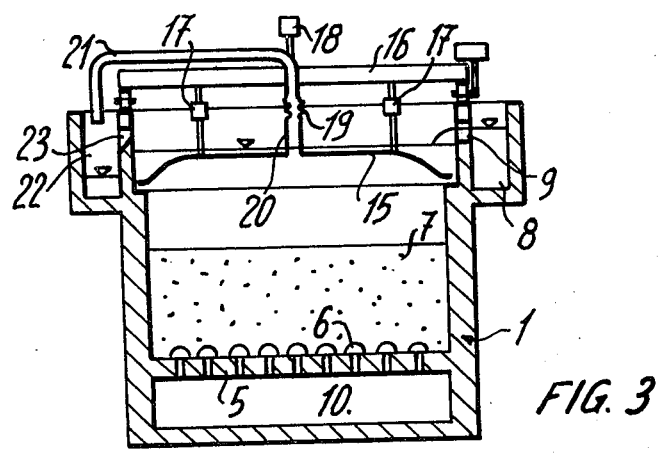
FIG. 3 is a transverse cross-section taken along line III—III of FIG. 1.

The bell 15 which is in an upper position above compartment 3 of the basin 1 (see FIGS. 2 and 3) is then automatically lowered, by the jacks 17, onto the upper edges of the partitions 14. Once the upper end of compartment 3 is thus fluid-tightly closed, the pump 18 is started and filtered water from the collecting chamber 10 is sucked through the filtering bed 7 of compartment 3 and evacuated by the conduit 21 into channel 22. According to the setting of the programmer (not shown), countercurrent flushing of the filtering bed 7 of compartment 3 takes place at a rate of 0.4 to 1 m$^3$ of filtered water per meter$^2$/minute during about 10 to 20 minutes, while filtering of the raw water by gravity continues to be carried out in compartments 2 and 4. At the end of this flushing period, the pump 18 stops, the bell 15 is moved back to its upper position shown in FIGS. 2 and 3 by the jacks 17, and the rolling bridge 16 is moved automatically to bring the bell 15 above compartment 2. The above-mentioned cycle of operations is automatically repeated for compartment 2 and, after a further movement of bell 15 by the rolling bridge 16, for the compartment 4. Then, the bell 15 is brought back above compartment 3 and the flushing operation is interrupted until the difference in the levels $N_n - N_f$ once more reaches a value at which the programmer of the flushing device is triggered.

The described equipment has the advantage of being entirely automatic and requires little supervision both from the point of view of the filtering operation and from that of flushing of the filtering beds which takes place automatically at the appropriate time, without requiring human intervention.

To obviate flooding as a result of a breakdown of the programmer, its electric supply circuit or of any other element of the equipment, a safety overflow 23 enables any excess raw water to flow directly into the channel 22 for evacuating dirty water.

Numerous variations of the described equipment may be envisaged. The number of compartments of the basin may be increased. Instead of being aligned side-by-side, the compartments could be disposed side-by-side in circular configuration and be separated from one another by radial partitions of a circular basin, for example. Instead of being actuated by hydraulic jacks 17, the bell 15 could be lifted and lowered by mechanical or electrical devices. These jacks could even be dispensed with and a bell 15 provided with resilient joints could be held at a constant level above the compartments of basin 1. In the nonoperative position (i.e. during normal filtering without flushing) this bell would be held astride two adjacent compartments.

Also, the term "bell" as herein used includes all types of member of an appropriate shape to obturate the opening in the upper end of each compartment.

I claim:

1. A gravity filtering equipment comprising a basin partitioned into a plurality of compartments each having a permeable bottom covered by a filtering bed, a conduit for the inlet of liquid to be filtered above the filtering beds, a filtered-liquid collection chamber common to said compartments disposed directly under the permeable bottoms of the compartments and extending uninterruptedly beneath the entire areas of the bottoms of said compartments, said chambers connected to a filtered-liquid evacuation conduit by an evacuating shaft and an overflow passage neighboring the upper edge of the basin, a device for flushing the filtering beds, said device comprising a bell-shaped hood having rim surfaces sealably engageable with upper wall surfaces of said compartments and movably carried above the basin by a support in a manner to be able to be successively brought above each of said compartments to fluid-tightly obturate the upper edges thereof one at a time, a pump having an intake end connected to a conduit leading into the inner face of the bell and an outlet end connected to a conduit for evacuating flushing liquid from the filtering beds, said pump having a vacuum pressure sufficient to draw water from the collection chamber through the permeable bottom and filtering bed of any one compartment independently of any other source of pressure, said pump being the sole source of pressure for flushing the filtering beds and jacks connecting said bell to said movable support, thus enabling the bell to be raised above and lowered onto the upper edge of the compartments to insure said sealable engagement.

* * * * *